(No Model.)
G. M. HENDEE.
BICYCLE.
No. 423,249. Patented Mar. 11, 1890.
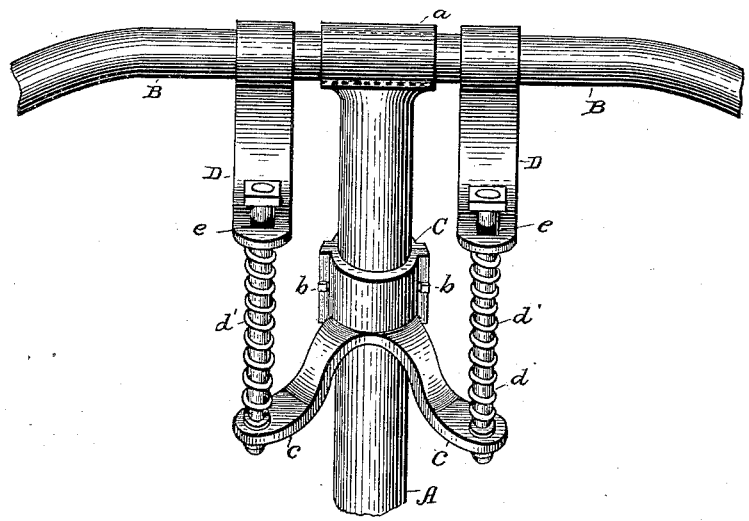
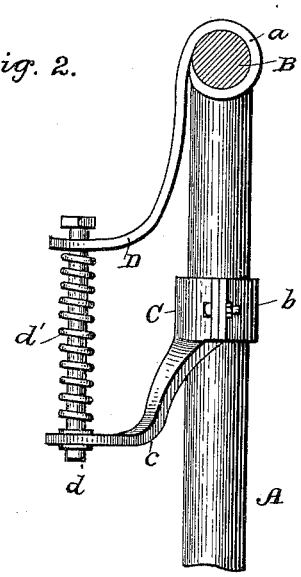
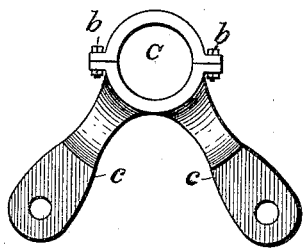
ATTEST.
Victor J. Evans.
E. Everett Ellis
George M. Hendee
INVENTOR.
By Wm. C. W. Intire
Atty.

UNITED STATES PATENT OFFICE.

GEORGE M. HENDEE, OF ROXBURY, MASSACHUSETTS.

BICYCLE.

SPECIFICATION forming part of Letters Patent No. 423,249, dated March 11, 1890.

Application filed November 4, 1889. Serial No. 329,154. (No model.)

*To all whom it may concern:*

Be it known that I, GEORGE M. HENDEE, a citizen of the United States, residing at Roxbury, in the county of Suffolk and State of Massachusetts, have invented certain new and useful Improvements in Handle-Bar Attachments for Bicycles; and I do hereby declare the following to be a full, clear, and exact description of the invention, such as will enable others skilled in the art to which it appertains to make and use the same.

This invention relates to certain new and useful improvements in spring attachments to the handle-bars of bicycles and similar vehicles; and it consists, substantially, in such features of arrangement, construction, and combinations of parts as will hereinafter be more particularly described, and pointed out in the claims.

The invention has for its object to provide a spring attachment for the handle-bars of bicycles and similar vehicles which shall act to lessen or distribute the vibrations to which the steering-fork and handle-bar of the machine are subject in travel, and thereby render it less tiresome or fatiguing to the operator to ride the machine.

The invention has for its further object to provide a spring attachment for the handle-bars of bicycles and similar vehicles which shall serve to receive and counteract the effects of sudden shock when an obstruction is encountered by the machine in its travel, and thereby prevent sudden loosening of the parts of the machine, as well as preserving them from wear, all as will more fully hereinafter appear when taken in connection with the accompanying drawings, wherein—

Figure 1 represents in vertical front elevation the handle-bar and upper portion of the steering-fork of an ordinary safety-bicycle, the same having my improvements embodied in connection therewith. Fig. 2 represents a side view of Fig. 1, and Fig. 3 is a top or plan view of the clamp or yoke which fits around the steering-fork.

In carrying my invention into effect I provide the upper end of the steering-fork with a collar or hollow bearing through which the handle-bar of the machine is received in the ordinary way, except that the said handle-bar, instead of being rigidly secured therein, is slightly loose or free to turn within prescribed limits.

Clamped or otherwise secured to the handle-bar of the machine on opposite sides of the steering-fork are suitable spring-arms which are slightly curved or bent to extend inward, and which arms are provided in their lower portions with slots which receive the upper ends of bolts which are rigid with and extend upwardly from two curved members or branches of a clamping-yoke that is secured to the steering-fork by suitable clamping-screws. The curved branches or members of the clamping-yoke extend outwardly in such manner as to also serve as a seat for cushioning springs which surround the bolts between such members and the under side of the arms, and the several parts are so arranged and adapted to each other as to lend attraction to the machine and not to interfere in any manner with its general working.

The effect of my improvement is that as the pressure is placed upon the ends of the handle-bar by the arms of the operator resting upon them the said handle-bar is induced or caused to rotate downwardly or backwardly, and as such bar is free to turn in its bearing in the upper end of the steering-fork the arms which are secured thereto will be carried downwardly to an extent corresponding to the movement of the bar, thereby compressing the springs and forming a cushion which receives and lessens the vibrations on the arms of the operator, all as will more fully hereinafter appear upon reference to the accompanying drawings, wherein—

A represents the steering-fork of an ordinary safety-bicycle or similar machine, the same being formed with a hollow bearing $a$, in which the handle-bar B works and is free to turn at the point indicated by the dotted lines. (See Fig. 1.)

C represents a clamping-yoke that is secured to the steering-fork by means of clamping-screws $b$, as shown, and which yoke is formed with two curved or outwardly-spread members or branches $c\ c$, to which are secured in an upright manner the pins or bolts $d\ d$, which carry the springs $d'\ d'$.

Secured to the handle-bar on opposite sides of the steering-fork are two arms D D, in each of which is formed a slot e, and which arms are so curved downwardly and inwardly as to have their slots come over or coincide with the bolts d d and receive such bolts in the manner shown in Figs. 1 and 2.

From the construction and arrangement explained it will be seen that an effective elastic cushion is obtained whereby the vibrations will be received and the effects thereof counteracted in an obvious manner, both in the ordinary working of the machine and when an obstruction is encountered. It will further be seen that while the handle-bar is free to turn or rotate within prescribed limits said bar is at the same time prevented from sidewise or longitudinal movement by virtue of the rigid connection established between the bar and steering-fork through the medium of arms D D and the clamping-yoke C. Thus it will be seen that no interference is had with the steering of the machine in any way.

Instead of employing a plain bearing for the handle-bar, it is evident that I may use either a ball or cone bearing for said bar, as the case may require, and in addition to this immaterial change to which I may resort I could also make similar changes in the construction and general arrangement of the other several operative parts; hence I do not wish to be understood as limiting myself thereto in precise detail.

Having thus described my invention, what I claim as new, and desire to secure by Letters Patent, is—

1. A spring attachment for the handle-bars of bicycles, the same consisting of arms adapted to be clamped to said bar, a yoke adapted to be clamped to the steering-fork, and elastic cushions arranged between said arms and yoke, substantially as described.

2. The combination, with the steering-fork of a bicycle, of a handle-bar free to rotate in the upper end of said bar, but prevented from longitudinal movement, spring-arms rigidly attached to said bar, a yoke clamped to the fork, and elastic cushions arranged between said arms and yoke, substantially as described.

3. The combination, with the steering-fork and the handle-bar free to rotate in the upper end thereof, of the yoke clamped to the fork and having the outwardly-spread members or branches, the bolts rigidly held by said members, the springs surrounding said bolts, and the curved spring-arms having the slots through which the upper ends of the bolts pass, the said arms being rigidly secured to the handle-bar on opposite sides of the fork, substantially as described.

In testimony whereof I affix my signature in presence of two witnesses.

GEORGE M. HENDEE.

Witnesses:
   JOHN B. HARLOW,
   EBENEZER STONE.